United States Patent
Hisanaga et al.

(10) Patent No.: US 7,104,061 B2
(45) Date of Patent: Sep. 12, 2006

(54) FLUID MACHINE

(75) Inventors: Shigeru Hisanaga, Kariya (JP);
Yasushi Yamanaka, Nakashima-gun (JP)

(73) Assignee: Denso Corporation, Kariya (JP)

( * ) Notice: Subject to any disclaimer, the term of this patent is extended or adjusted under 35 U.S.C. 154(b) by 63 days.

(21) Appl. No.: 10/827,246

(22) Filed: Apr. 20, 2004

(65) Prior Publication Data
US 2004/0211180 A1 Oct. 28, 2004

(30) Foreign Application Priority Data
Apr. 22, 2003 (JP) .............................. 2003-117373

(51) Int. Cl.
*F01N 5/02* (2006.01)
*B60H 1/32* (2006.01)
*F04C 23/00* (2006.01)
*F04C 25/00* (2006.01)
*F04B 35/01* (2006.01)
*F25B 27/00* (2006.01)
*G06F 13/40* (2006.01)
*F02G 1/00* (2006.01)

(52) U.S. Cl. .......................... 60/597; 60/618; 60/620; 60/623; 60/624

(58) Field of Classification Search .................. 60/597, 60/618, 620, 623, 624
See application file for complete search history.

(56) References Cited

U.S. PATENT DOCUMENTS

| | | | | |
|---|---|---|---|---|
| 4,452,043 A | * | 6/1984 | Wallace ........................ | 60/624 |
| 4,884,407 A | * | 12/1989 | Hatanaka ...................... | 60/624 |
| 4,996,839 A | * | 3/1991 | Wilkinson et al. ............. | 60/247 |
| 5,729,978 A | * | 3/1998 | Hiereth et al. ................. | 60/624 |
| 5,887,434 A | * | 3/1999 | Arnell et al. ................. | 123/561 |
| 6,050,094 A | * | 4/2000 | Udd et al. ..................... | 60/624 |
| 6,725,662 B1 | * | 4/2004 | Baba et al. .................... | 60/670 |
| 6,935,129 B1 | * | 8/2005 | Sasaki et al. .................. | 60/618 |
| 2005/0193734 A1 | * | 9/2005 | Iwanami et al. ............... | 60/657 |

FOREIGN PATENT DOCUMENTS

| | | |
|---|---|---|
| DE | 1004019668 A1 * | 11/2004 |
| JP | A-H09-250474 | 9/1997 |
| JP | 2004322914 A * | 11/2004 |

OTHER PUBLICATIONS

U.S. Appl. No. 10/764,534, filed Jan. 27, 2004, Iwanami et al.

* cited by examiner

*Primary Examiner*—Sheldon J Richter
(74) *Attorney, Agent, or Firm*—Posz Law Group, PLC

(57) ABSTRACT

A fluid machine for a waste heat collecting system for an internal combustion engine has an object to make most use of the collected waste heat and an operation of a compressor, an alternator or the like by a rotational driving force from an expansion device function well even during an engine running is stopped. The fluid machine according to the present invention has a pulley connected to the engine, an expansion device for generating a rotational driving force from the collected waste heat, a compressor device driven by the pulley and the expansion device, wherein a rotating shaft is commonly used for the pulley, the expansion device and the compressor device. The expansion device is an expansion device for changing its expansion volume, so that the Rankine cycle for collecting the waste heat can be operated most effectively.

9 Claims, 10 Drawing Sheets

(ROTATIONAL ANGLE : 0°)

(ROTATIONAL ANGLE : 90°)

(ROTATIONAL ANGLE : 270°)

(ROTATIONAL ANGLE : 180°)

(ROTATIONAL ANGLE : 0°)

(ROTATIONAL ANGLE : 90°)

(ROTATIONAL ANGLE : 270°)

(ROTATIONAL ANGLE : 180°)

(ROTATIONAL ANGLE : 0°)

(ROTATIONAL ANGLE : 90°)

(ROTATIONAL ANGLE : 270°)

(ROTATIONAL ANGLE : 180°)

FLUID MACHINE

CROSS REFERENCE TO RELATED APPLICATION

This application is based on Japanese Patent Application No. 2003-117373 filed on Apr. 22, 2003, the disclosure of which is incorporated herein by reference.

FIELD OF THE INVENTION

The present invention relates to a fluid machine, more particularly a fluid machine for motor vehicle having a compressor device for a refrigerant cycle and an expanding device for collecting waste heat from an engine to generate a rotational driving force for driving the compressor.

BACKGROUND OF THE INVENTION

As prior art technology, a fluid machine is known as shown in Japanese Patent Publication No.H9-250474. In this prior art, an expansion device and a compressor device are assembled into a single hermetically sealed casing, the expansion device converts heat energy into a rotational driving force in a Rankine cycle, and the compressor device is driven by the rotational force generated by the expansion device, to operate the refrigerating cycle.

In the above mentioned prior art, however, the rotational driving force generated at the expansion device can not be used for other purposes than driving the compressor device, because the expansion device and compressor device are integrally connected in the hermetically sealed casing. Furthermore, if the above mentioned prior art machine were installed in a motor vehicle to drive the compressor device by using the waste heat from an engine, it would not always be possible to get heat energy enough to drive the compressor device depending on running conditions of the motor vehicle. In such a case, the compressor device would not be operated, and therefore it would be a disadvantage in that air conditioning operation based on the refrigerating cycle by the compressor device may not be possible.

SUMMARY OF THE INVENTION

It is, therefore, an object of the present invention, in view of the above mentioned problems, to provide a fluid machine which can transmit a rotational driving force generated at an expansion device to not only a compressor device but to other devices, and which would not become an obstacle for driving the other devices even in such a case that a sufficient heat energy for the Rankine cycle can not be obtained.

It is another object of the present invention to provide a fluid machine for collecting most effectively waste heat from an engine by the Rankine cycle to generate a rotational driving force.

According to one of the features of the present invention, a pulley to be connected to an engine via a pulley belt, an expansion device of the Rankine cycle for collecting waste heat and generating a rotational driving force and a compressor to be driven by the engine through the pulley or by the expansion device are operatively connected by a single rotating shaft and the expansion device is of such a type which can vary an expansion volume depending on the operational condition of the Rankine cycle to most effectively collect the waste heat.

According to another feature of the present invention, the expansion device is of a scroll type and the rotating shaft and the expansion device is operatively connected over a crank mechanism, so that a radius of an orbit motion of a movable scroll can be automatically varied depending on the operating condition of the fluid machine, namely an operation in which the rotating shaft is driven by the rotation of the expansion device or an operation in which the expansion device is running idle by the rotation of the shaft. According to the crank mechanism, even when the movable scroll of the expansion device is rotated by the shaft during such a period in which the waste heat to be collected is very small and the expansion device is not operated by the Rankine cycle, the load for rotating the movable scroll is very small.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
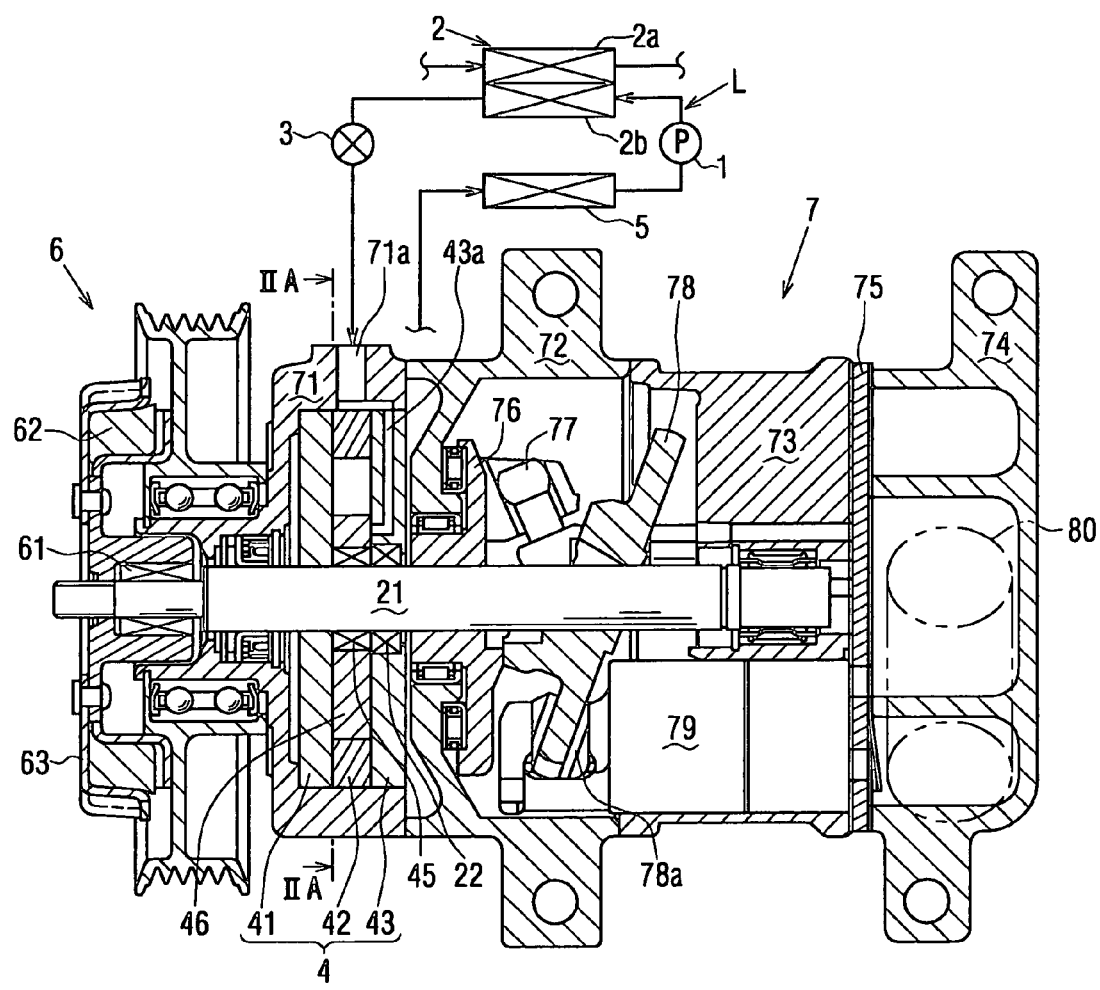
FIG. 1 is a cross-sectional view showing a fluid machine according to a first embodiment of the present invention.

A first embodiment of the present invention will now be explained with reference to FIG. 1. In this embodiment, a fluid machine is installed in a motor vehicle, wherein the fluid machine comprises a compressor device 7 operating in a refrigerating cycle for an automotive air-conditioner receiving a rotational driving force from an engine, and an expansion device 4 operating in a Rankine cycle L in which a refrigerant will be heated by waste heat from the engine to generate a rotational force.

The fluid machine further comprises a pulley 6 which is driven by an engine (not shown), and a shaft 21 which is commonly used as a rotational shaft for the expansion device, compressor device 7 and the pulley.

The pulley 6 is a DL pulley (damping and limiting pulley) comprising a damper portion 62 for absorbing torque fluctuations of the expansion device 4 and the compressor device 7, and a limiter portion 63 for cutting off a transmission of a rotational driving force from the engine to the compressor device 7 with idle running at this portion when a torque for driving the compressor device 7 is necessary more than a predetermined value, for example when the compressor device 7 is locked due to some reasons, so that an overload to the engine can be suppressed. The pulley 6 is operatively connected to the shaft 21 over a one-way clutch 61. It is possible to provide a driving source (for example, an electric motor) to the end of the shaft, instead of the pulley 6.

The Rankine cycle L comprises a pump 1 for circulating a refrigerant, a heating device 2 heating and evaporating the liquid-phase refrigerant flowing through a refrigerant passage 2b by heat from engine cooling water flowing through a cooling water passage 2a, the expansion device 4 to generate the rotational driving force by expanding high-pressure refrigerant, and a condenser 5 for cooling down and condensing the refrigerant, wherein the above mentioned devices and parts are connected in series by pipes to form a closed loop. In this embodiment, the same refrigerant for the refrigerating cycle R is used for the Rankine cycle L, so that it is advantageous in that the sealing between the expansion device and the compressor device is not strictly required. An ON-OFF valve 3 (a switching means) of an electromagnetic valve is provided at an upstream side of the expansion device 4 for controlling a flow of the refrigerant.

Figure 2A:
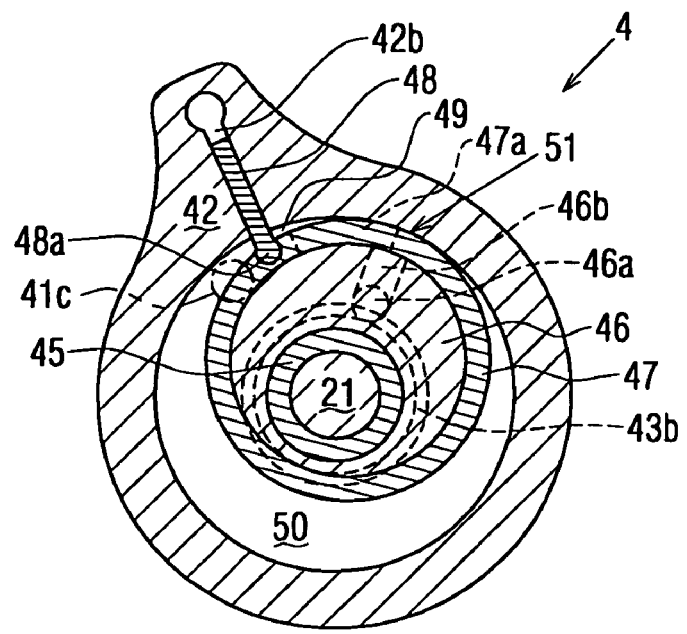
FIG. 2A is a cross-sectional view of an expansion device taken along a line IIA—IIA in FIG. 1.

FIG. 2A is a cross-sectional view of the expansion device 4 taken along a line IIA—IIA of FIG. 1, in which the expansion device 4 is a rotary type. A hermetically sealed working chamber 49 is formed in the expansion device 4 to generate a rotational driving force and transmit the force to the shaft 21, by introducing therein high-pressure gas and expanding the same in the working chamber 49.

The working chamber 49 is formed in the following manner. A lunar space is formed by a cylindrical inner surface of a cylinder 42 and a cylindrical outer surface of a sleeve 47, wherein the cylindrical outer surface is contacted with the cylindrical inner surface at a rotor contact line 51. A forward end of a vane 48 is pivotally connected to a hinge portion 48a of the outer cylindrical surface of the sleeve 47, so that the lunar space is divided into two spaces.

The cylinder 42 is interposed between a front and a rear side plates 41 and 43, wherein the sleeve 47 and the vane 48 are disposed in the lunar space with minute gaps between the longitudinal ends thereof and inner surfaces of the plates 41 and 43 so that the sleeve 47 and vane 48 are movable in the lunar space. As above, two working chambers 49 and 50 are formed.

A rotor 46 is connected to the shaft 21 over a one-way clutch 45 and the center of the rotor is eccentric from a center of a circular formed by the cylindrical inner surface of the cylinder 42. An oil film is formed at an outer surface of the rotor 46 and the rotor 46 is inserted into the sleeve 47, wherein a minute gap is formed between the rotor 46 and the sleeve 47 so that they are relatively movable to each other.

A circular groove 43b is formed on the inner surface of the rear side plate 43, which is a sliding surface to the rotor 46. A plate inlet passage 43a is formed in the rear side plate 43, one end of which is connected to the circular groove 43b and the other end of which is connected to an expansion device inlet port 71a formed in a front housing 71.

A rotor inlet port 46a is formed in the rotor 46, one end of which terminates at one side surface of the rotor 46 and is opening to the circular groove 43b, so that one end of the rotor inlet port 46a is always communicated with the circular groove 43b. The rotor inlet port 46a extends in the rotor 46 in a longitudinal direction and the other end thereof is communicated with one end of a rotor radial passage 46b which is formed inside the rotor 46 and extending in a radial direction and terminates at the outer peripheral surface of the rotor 46. A sleeve inlet port 47a is formed in the sleeve 47 adjacent to the vane 48 and passing through the sleeve in the radial direction.

A passage for the refrigerant is thus formed by the inlet port 71a formed in the front housing 71, the plate inlet passage 43a formed in the rear side plate 43, the circular groove 43b also formed in the surface of the rear side plate 43, the rotor inlet port 46a formed in the rotor 46, and the rotor radial passage 46b also formed in the rotor 46. And the above refrigerant passage terminates at the inner surface of the sleeve 47 or is communicated to the sleeve inlet port 47a depending on a rotational position of the rotor 46.

Since the sleeve inlet port 47a is formed in the sleeve 47 with a certain angular length, so long as the outer end of the rotor radial passage 46b is communicated to the sleeve inlet port 47a the refrigerant will flow into the working chamber 49. A vane groove 42b is formed in the cylinder 42, into which the vane 48 is inserted with minute gaps between the vane 48 and the vane groove 42b, so that the vane 48 moves back and forth in the groove 42b, while keeping a sealing effect.

Since one end of the vane 48 is connected to the sleeve 47 by a hinge joint at the hinge portion 48a, the vane 48 moves back and forth depending on a position of orbital movement of the sleeve 47, namely the rotational position of the rotor 46. A seal element 22 is disposed on the shaft 21 for sealing a gap between the rear side plate and the shaft 21.

Figure 2B:
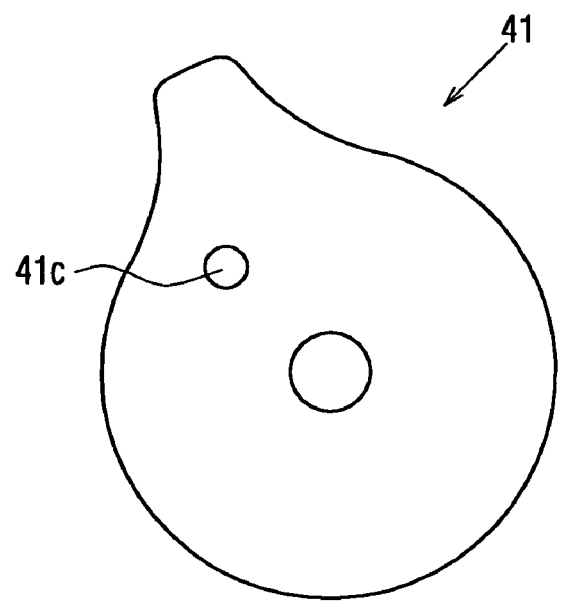
FIG. 2B is a front view of a front side plate of an expansion device.

FIG. 2B shows a front view of the front side plate when viewed in a right-hand direction in FIG. 1, wherein a numeral 41c designates a discharge port formed in the front side plate 41, one end of which is opening to the space formed by the cylinder 42 and the front and rear side plates 41 and 43 and the other end of which is communicated with a discharge passage (not shown) formed in the front housing 71.

Figure 3A:
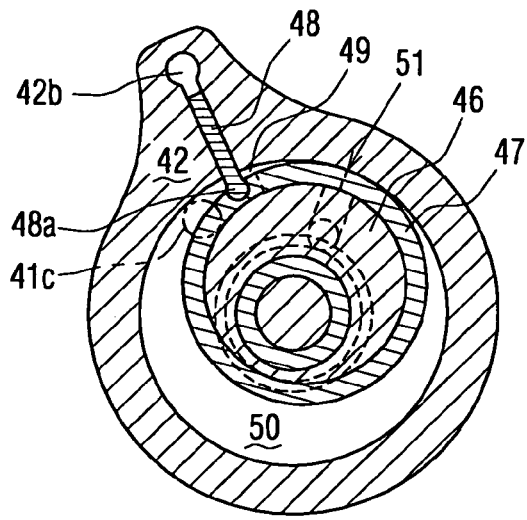
FIGS. 3A to 3D are cross-sectional views of the expansion device showing operational modes of the expansion device.

An operation of the above explained fluid machine will be explained with reference to FIGS. 3A to 3D. FIG. 3A shows a starting position of the rotor 46, which corresponds to 0 degrees of the rotational angle of the rotor 46. In this position, when high pressure gas is supplied to the expansion device from the Rankine cycle L, the high pressure gas flows into the working chamber 49 through the front housing 71, rear side plate 43, the rotor 46 and the sleeve 47. The high pressure gas will be then expanded in the working chamber 49, which is surrounded by the inner surface of the cylinder 42, the outer surface of the sleeve 47, the vane 48, the front side plate 41, rear side plate 43, the hinge portion 48a and the rotor contact line 51.

In this position, the other chamber 50 is communicated with the discharge port 41c, the refrigerant gas filled in the chamber 50 will flows out through the discharge port 41c as the rotor 46 rotates.

Figure 3B:
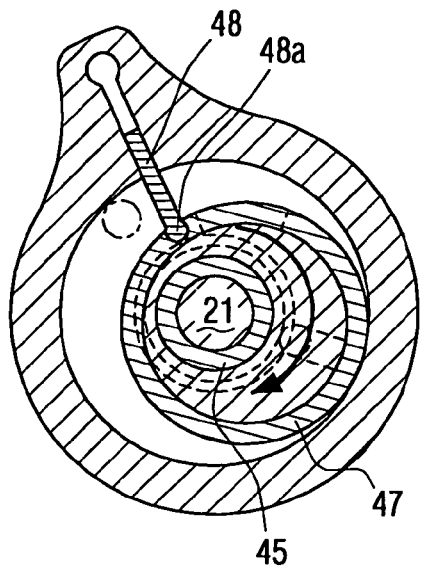

The expansion energy rotates the rotor 46 and the sleeve 47, moving the rotor contact line 51 in a clockwise direction to a position of FIG. 3B, which corresponds to 90 degrees of the rotational angle of the rotor 46. In this operation, the rotor 46 is connected to the shaft 21 over the one-way clutch 45, so that the shaft 21 is likewise rotated by 90 degrees. The vane 48 is pulled out by the hinge portion 48a from the groove 42b during this operation of 90 degrees rotation, since the vane 48 is connected to the sleeve 47 at the hinge portion 48a by the hinge joint.

Figure 3D:
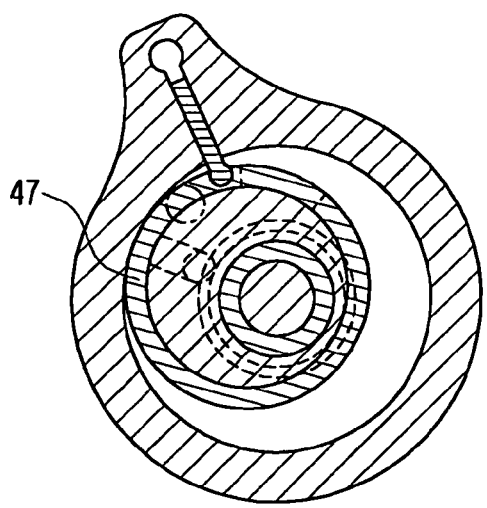
Figure 3C:
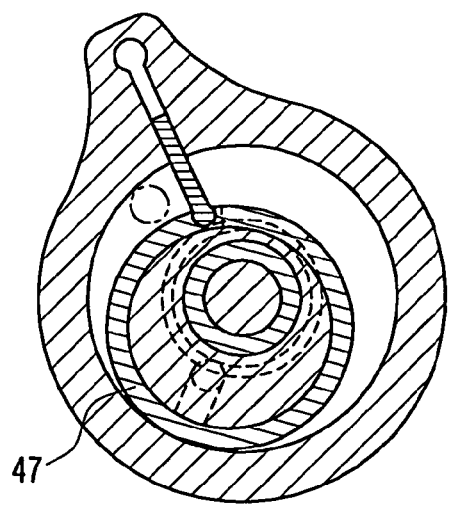

The sleeve 47 is further rotated around the shaft 21 in response to the expansion of the high pressure gas to a position in FIG. 3C and to a position in FIG. 3D, which respectively correspond to the 180 and 270 degrees of the rotational angle of the rotor 46. During this rotation, the shaft 21 is likewise rotated by 270 degrees over the one-way clutch 45.

When the sleeve 47 comes to the position in FIG. 3D, the discharge port 41c is closed by the side surfaces of the sleeve 47 and the rotor 46.

When the sleeve 47 is further rotated by the expansion of the high pressure gas, the position of the rotor 46 comes to the starting position of FIG. 3A, and another high pressure gas will flow into the working chamber 49 to repeat the above operation. Thus, so long as the high pressure gas flows into the working chamber, the sleeve 47 continues to rotate and thereby the shaft 21 is also continuously rotated.

An operation of the fluid machine will be further explained with reference to FIG. 1, including a description of a construction of the compressor device 7. The compressor device 7 is a variable-capacity and swash-plate type compressor, which can vary its compression capacity.

(Air-conditioning Mode)

When an air-conditioning operation is necessary, the rotational driving force from the engine is transmitted to the shaft 21 through the belt and pulley 6, and a plate 76 fixed to the shaft 21 is accordingly rotated. A slant angle variable mechanism 77 and a swash plate 78 are likewise rotated and this rotation will be converted to a reciprocal movement for pistons 79 over shoes 78a.

A refrigerant gas will be compressed by the reciprocal movement of the pistons 79, and circulated in the refrigerating cycle R (not shown). In FIG. 1, a reference numeral 72 designates a crank casing, 73 a cylinder casing, 74 a rear housing, and 75 a valve plate, constituting a well known compressor.

When a high air-conditioning performance is not necessary, the slant angle of the swash plate 78 is controlled to be a small angle by a control valve 80, so that a stroke of the piston 79 will be made smaller and thereby the compression performance of the compressor device 7 will be reduced. Accordingly, consumption of the driving energy from the engine can be reduced in response to the cooling load. When the air-conditioning operation is not necessary, the slant angle of the swash plate 78 is made to be zero, the swash plate 78 being perpendicular to the shaft 21, and the stroke of the piston 79 will become zero. As a result of this operation, the consumption of the driving energy from the engine can be made at its minimum value.

In the case that the air-conditioning operation is necessary but the waste heat from the engine is not enough to drive the expansion device, the pump 1 of the Rankine cycle will not be operated and thereby the high pressure gas will not be supplied to the expansion device 4. Since the shaft 21 is operatively connected to the expansion device 4 over the one-way clutch 45, non-operation of the expansion device 4 will not become any obstacle to the rotational movement of the shaft 21 driven by the engine, namely the operation of the compressor device 7, even in case that the expansion device is not running. And increase of the consumption of the driving energy from the engine can be suppressed at its minimum amount.

On the other hand, in the case that the air-conditioning operation is necessary and waste heat from the engine can be sufficiently collected, the refrigerant gas for the Rankine cycle is pressurized by the pump 1 and the expansion device 4 will be operated. Until a rotational speed of the expansion device 4 reaches a rotational speed of the shaft 21, which is driven by the engine, the rotational force of the expansion device 4 will not be applied to the shaft because of the one-way clutch 45, and therefore the rotation of the expansion device 4 will not be an obstacle for the rotation of the compressor device 7.

During the above operation, any load will be applied to the expansion device 4, the rotational speed will be quickly enhanced and reaches the rotational speed of the shaft 21. Then the expansion device 4 and the shaft 21 will become unified and the rotational force of the expansion device 4 will be applied to the shaft 21, so that the rotational forces from the engine and the expansion device 4 share the load for driving the compressor device 7. As a result, the consumption of the driving energy from the engine can be reduced.

(Idle-stop Operation Mode)

In the case that the air-conditioning operation is necessary even while the engine is not running, for example when the engine operation is stopped at a red traffic lamp, the compressor device 7 will be continuously operated by the rotational force generated at the expansion device 4. When the engine operation is stopped, the expansion device can continuously generate the rotational force if the waste heat from the engine can be sufficiently collected. In this situation, the engine is not running and thereby the pulley 6 connected to the engine over the belt is not either rotated. Since the one-way clutch 61 is interposed between the pulley 6 and the shaft 21, the shaft 21 can be rotated by the expansion device 4 even when the pulley 6 is not rotating.

As above, the compressor device 7 is continuously rotated by the expansion device 4 and the air-conditioning operation will be continued even when the engine running is stopped. In other words, the idle stop of the engine can be possible while keeping the air-conditioning mode, and thereby improvement of the fuel consumption ratio can be achieved. In this operation, namely the compressor device 7 is operated only by the rotational force from the expansion device 4, the compression volume of the compressor device 7 is made to be such a small amount, at which the minimum air-conditioning operation can be done, by making the slant angle of the swash plate 78 a smaller angle.

In the above embodiment, the one-way clutch 45 is disposed between the expansion device 4 and the shaft 21. It is, however, possible to delete the one-way clutch 45. In this case, although the expansion device 4 would become a load for the engine, the load itself is negligibly small, because the refrigerant gas in the expansion device 4 is simply churned.

In the above modification, namely in the case that the one-way clutch 45 between the expansion device and the shaft is taken away, the ON-OFF valve 3 may be provided at an upstream side of the expansion device 4 for controlling the supply of the refrigerant gas to the expansion device 4. It is necessary for a motor vehicle having an engine to warm up the same in a shorter period to improve a fuel consumption ratio and to cleanup exhausted gas, in particular during a winter season. For this purpose, auxiliary machines, such as a viscous coupling, will be in some cases provided to increase the load for the engine and to speed up the warming thereof.

In the case of the above modification, when the ON-OFF valve 3 is closed during the warming up period, the load for the engine will become higher and the warming up period will become shorter, because when the expansion device 4 is rotated with the ON-OFF valve closed the air pressure of the working chambers of the expansion device will be decreased in proportion to the expansion of the working chambers.

Further, in the above modification, when the warming up of the engine is not necessary and the Rankine cycle will not be operated, the ON-OFF valve 3 is opened. Then the load for the engine will not be greatly increased, because the refrigerant gas in the expansion device 4 is simply churned in this operation.

In the above embodiment, since the expansion device 4 is disposed between the pulley 6 and the compressor device 7, the construction of the compressor device 7 can be the same to the ordinary compressor and can be made smaller.

Furthermore, in the above embodiment, since the variable capacity compressor device 7 is used, the operational load for the expansion device 4 can be made smaller when the compressor device 7 is driven only by the expansion device 4, whereas the operational load for the engine can be made larger when the warming up the engine in a shorter period is necessary.

Second Embodiment

Figure 4:
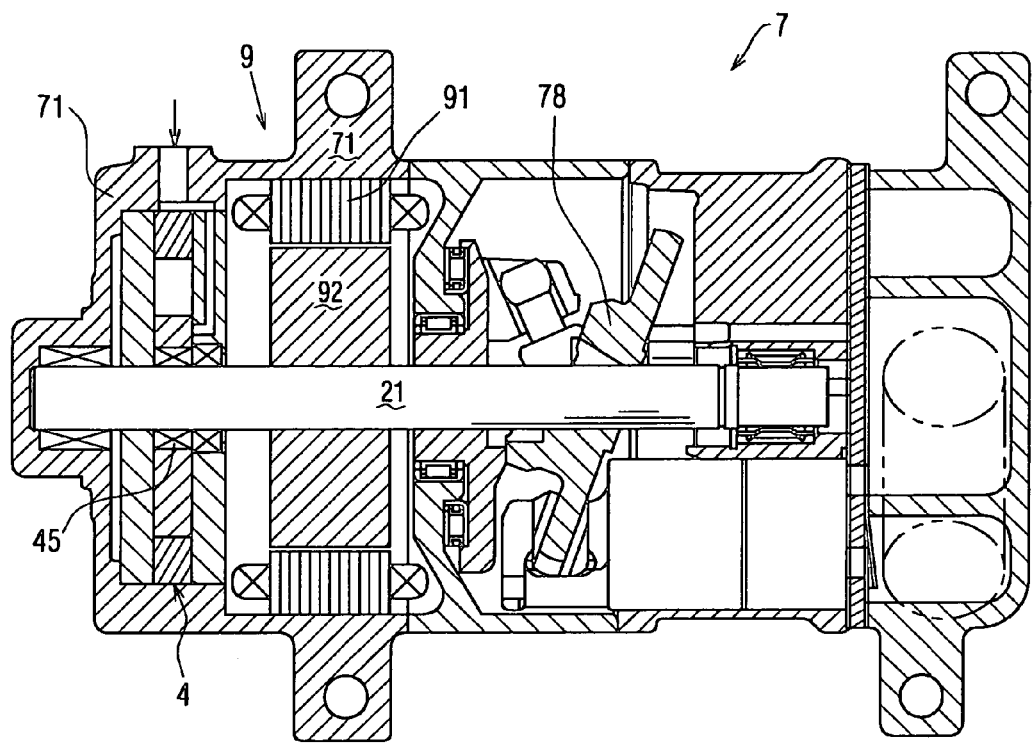
FIG. 4 is a cross-sectional view showing a fluid machine according to a second embodiment of the present invention.

FIG. 4 shows a second embodiment of the present invention, which differs from the first embodiment in that the pulley 6 is taken away and instead an electric rotating machine 9 is provided between the expansion device 4 and the compressor device 7, wherein the electric rotating machine 9 operates as an electric motor or an electric power generating machine. The fluid machine of this second embodiment is preferably installed in a vehicle of a fuel cell type, in which the compressor device 7 for the refrigerating cycle R is driven by the electric motor 9, whereas the expansion device 4 for the Rankine cycle L is operated by waste heat from fuel cell stacks (FC stacks).

The electric rotating machine 9 is formed in the front housing 71 and comprises a stator 91 and a rotor 92, wherein the shaft 21 is commonly used for the expansion device 4, the electric rotating machine 9 and the compressor device 7. The operation of this second embodiment will be explained.

(Air-conditioning Mode)

When the air-conditioning operation is necessary, the shaft 21 is rotated by the electric motor 9 and thereby the compressor device 7 is driven. Then the refrigerant will be compressed and circulated in the refrigerating cycle R (not shown) to perform the air-conditioning operation. In this air-conditioning operation, in the case that the waste heat from the FC stacks is not sufficiently high, the refrigerant for the Rankine cycle L will not be pressurized by the pump and high pressure refrigerant gas will not be supplied to the expansion device 4. Namely, the expansion device 4 will not be operated.

Since the shaft 21 is operatively connected to the expansion device 4 over the one-way clutch 45, the rotation of the shaft 21 and the operation of the compressor device 7 will not be influenced by the non-operation of the expansion device 4 and therefore the additional driving energy of the electric motor 9 necessary for the rotation of the shaft 21 due to the operative connection to the expansion device 4 is negligibly small. On the other hand, there is sufficient high waste heat from the FC stacks during the air-conditioning operation, the refrigerant gas for the Rankine cycle L will be pressurized by the pump and the high pressure refrigerant gas will be supplied to the expansion device 4 to start the operation of the same.

The expansion device 4 will be running idle over the one-way clutch 45 until the rotational speed of the same reaches the rotational speed of the shaft 21 (and the compressor device 7), during which the rotation of the shaft 21 is not affected by the expansion device 4. And also during this period, since no rotational load is applied to the expansion device 4, the rotational speed of the expansion device 4 will be quickly increased to the rotational speed of the shaft 21 and the compressor device 7.

When the rotational speed of the expansion device 4 reaches that of the shaft 21, then the expansion device 4 and the shaft 21 will be rotated as one unit, and the rotational driving force will be applied to the compressor device 7, to share the driving force for the compressor device 7 with the electric motor 9 so that the necessary driving force from the electric motor 9 will be reduced.

(Electric Power Generation Mode)

In the case that electric power from a battery (not shown) is running short, the supply of the electric power is cut off, and the operation of the compressor device 7 is continued by the rotational driving force from the expansion device 4, so long as the waste heat from the FC stacks is available. In this case, even when the supply of the electric power to the electric rotating machine 9 is cut off, the shaft 21 and the rotor 92 are rotated by the expansion device 4. And therefore, the electric rotating machine 9 operates in this case as an electric power generating machine to generate electric power. The generated electric power will be charged into the battery or supplied to any other electric devices.

As above, the air-conditioning operation can be continued by making use of the waste heat even when the electric rotating machine 9 is not operated as the electric motor for generating the rotational driving force. In addition, energy saving becomes possible by operating the machine 9 as the electric power generating machine. During the above operation, the compressor capacity may be made smaller by making the slant angle of the swash plate 78 to a smaller angle, because the compressor device 7 is operated by only the rotational driving force from the expansion device 4.

Third Embodiment

Figure 5:
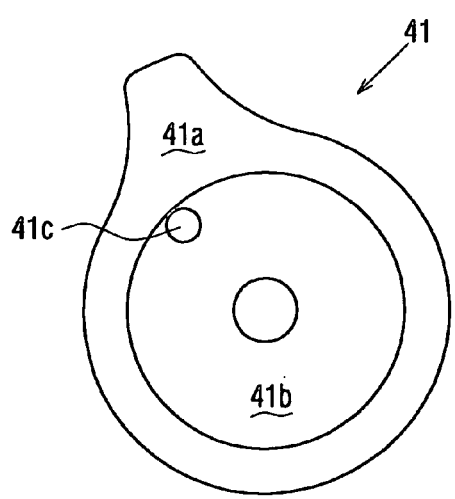
FIG. 5 is a front view of a front side plate of an expansion device according to a third embodiment of the present invention.

A third embodiment will now be explained with reference to FIG. 5, which differs from the first embodiment in that the volume of the working chamber for the expansion device 4 is made to be variable. FIG. 5 shows a front view of the front side plate 41, which is divided into two parts (an outer plate 41*a* and an inner plate 41*b*) when compared with the first embodiment. The outer plate 41*a* has a cylindrical bore into which the inner plate 41*b* is rotationally inserted so that the relative position of the inner plate 41*b* to the outer plate 41*a* will be changeable, and the inner plate 41*b* will be rotated by a control means (not shown) depending on the operation of the expansion device 4. As seen from FIG. 5, the discharge port 41*c* is likewise formed in the inner plate 41*b*, so that the position of the discharge port 41*c* can be changeable together with the inner plate 41*b*.

FIGS. 6A to 6D show the respective positions of the rotor 46 and the sleeve 47 at the rotational positions of the rotor 46 of 0, 90, 180 and 270 degrees, as in the same manner of FIGS. 3A to 3D. At the starting position shown in FIG. 6A, the working chamber 49 is communicated to the rotor radial passage 46b through the sleeve inlet port 47a, so that high pressure refrigerant gas flows into the working chamber 49. At the same time, the working chamber 50 begins with the communication to the discharge port 41c, so that the expansion of the refrigerant gas in the chamber 50 stops and flows out through this discharge port 41c.

The rotor 46 and the sleeve 47 are rotated in response to the expansion of the refrigerant gas in the working chamber 49, and the positions of rotor 46 and the sleeve 47 move from FIG. 6A to FIG. 6B, FIG. 6C and FIG. 6D. When the rotor 46 and the sleeve 47 come to the position in FIG. 6D, the discharge port 41c is closed and the discharge stroke of the working chamber 50 comes to an end. Accordingly, the end of the discharge stroke will be decided by the position of the discharge port 41c.

Figure 6A:
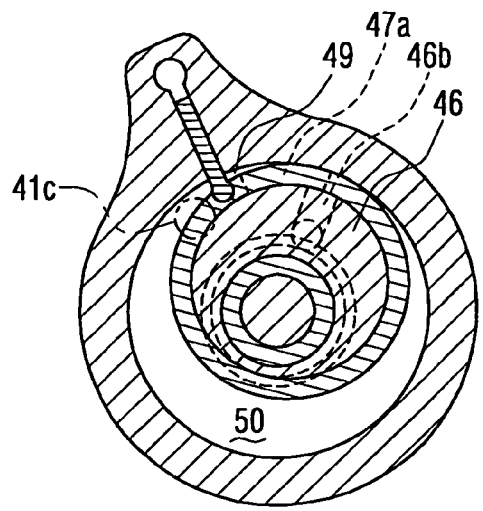
FIGS. 6A to 6D are cross-sectional views of the expansion device showing operational modes thereof.
Figure 6B:
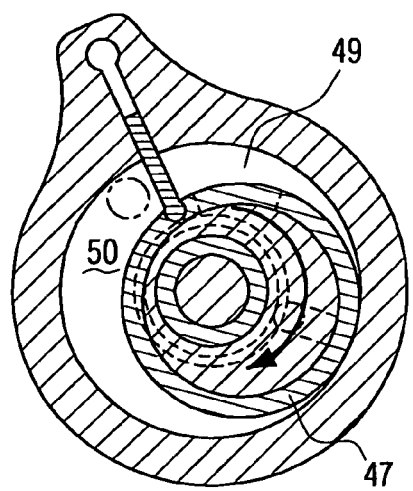
Figure 6D:
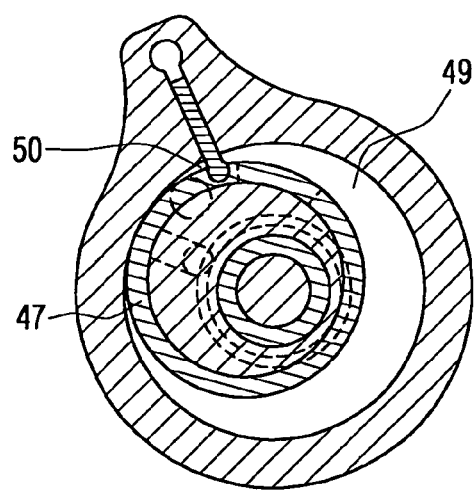
Figure 6C:
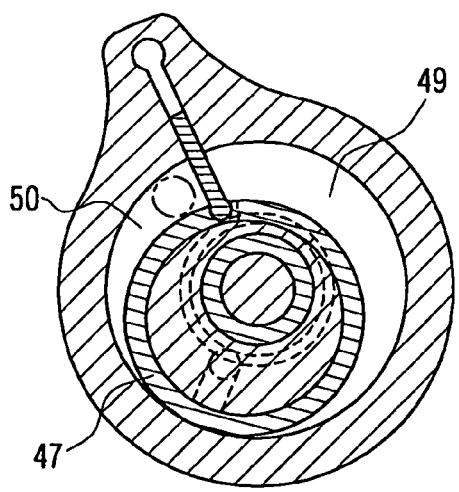

In FIGS. 6A to 6D, the discharge port 41c is positioned at such a point where the discharge port 41c will be closed when the rotor 46 and the sleeve 47 are rotated by 270 degrees from the initial position of FIG. 6A. In other words, the discharge port 41c starts the communication with the working chamber 50 shortly before the rotor 46 is rotated to its initial position of FIG. 6A. In the case that a pressure of the Rankine cycle L at its lower pressure side becomes higher, the refrigerant gas in the working chamber should be discharged at an earlier point, namely the discharge stroke shall be ended at the earlier point. Otherwise, the pressure in the working chamber becomes lower than the pressure of the Rankine cycle at its lower pressure side, and thereby instead of collecting the energy from the expansion of the refrigerant gas, additional energy would become necessary for decreasing the pressure in the working chamber to a further lower pressure side, reducing the operating efficiency of the expansion device. (This is referred to as an excessive expansion phenomenon.)

On the other hand, in the case the pressure of the Rankine cycle L at its lower pressure side becomes lower, more energy can be collected by the expansion of the refrigerant gas in the working chamber. And therefore, in such a case the discharge stroke of the refrigerant gas should start at a later point. When the discharge port 41c is positioned at such an earlier point, even if the more energy can be collected from the expansion of the refrigerant gas, the refrigerant gas will flow out through the opening of the discharge port to the working chamber, also reducing the operating efficiency of the expansion device. (This is referred to as an insufficient expansion phenomenon.)

Figure 7A:
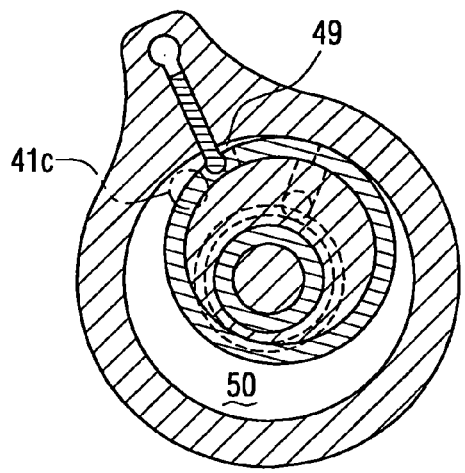
FIGS. 7A to 7D are cross-sectional views of the expansion device, which is a variable type device, showing operational modes thereof.
Figure 7D:
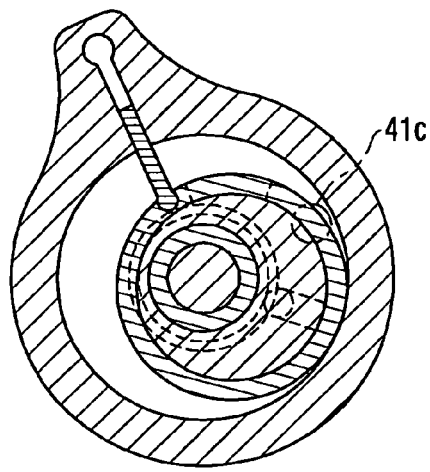
Figure 7B:
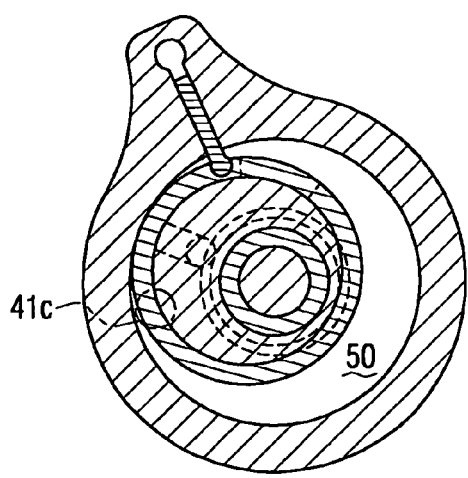
Figure 7C:
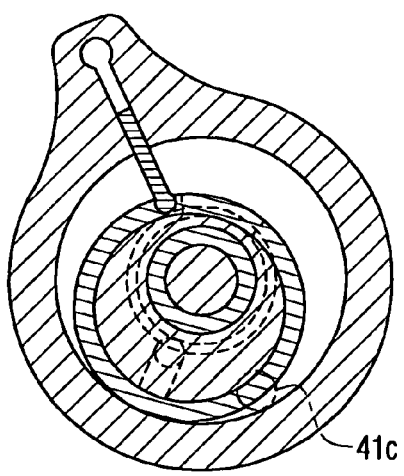

FIGS. 7A to 7D show the various positions of the discharge port 41c for changing the expansion volume of the refrigerant gas in the working chamber. FIG. 7A shows the position of the discharge port 41c, which is the same to that shown in FIG. 6A. FIG. 7B shows the position of the discharge port 41c which is rotated by 90 degrees in a anti-clockwise direction. This rotation will be done by an actuator (not shown), by rotating the inner plate 41b. With the discharge port 41c at the position in FIG. 7B, the discharge stroke of the working chamber 50 will be earlier ended than the position of the discharge port 41c of FIG. 7A by 90 degrees. FIGS. 7C and 7D likewise show other positions of the discharge port 41c, wherein the discharge port 41c is further rotated in the anti-clockwise direction by 180 and 270 degrees, respectively. As above, the expansion space (volume) of the working chamber before starting the discharge stroke can be made smaller by moving the discharge port 41c in the anti-clockwise direction. Accordingly, when the pressure of the Rankine cycle at its lower pressure side is increased, the discharge port 41c can be moved in the anti-clockwise direction in response to such pressure increase, to suppress the excessive expansion of the refrigerant gas, and vice versa. As a result, the expansion device 4 can be operated at its highest operational efficiency by changing the expansion volume of the working chamber in accordance with the operational condition of the Rankine cycle.

The pressure of the Rankine cycle L at the lower pressure side will be largely changed depending on the various external conditions, for example the amount of the collected waste heat, the amount of the refrigerant gas flowing through the cycle, and so on. It can be possible to operate the Rankine cycle in such a manner that the pressure of the Rankine cycle at its lower pressure side is controlled at a certain constant value so that the expansion device can operate at its highest efficiency. According to the third embodiment of the present invention, however, the highest operational efficiency of the expansion device is achieved by changing expansion volume of the refrigerant gas in the working chamber of the expansion device depending on the operational conditions of the Rankine cycle.

Fourth Embodiment

Figure 8:
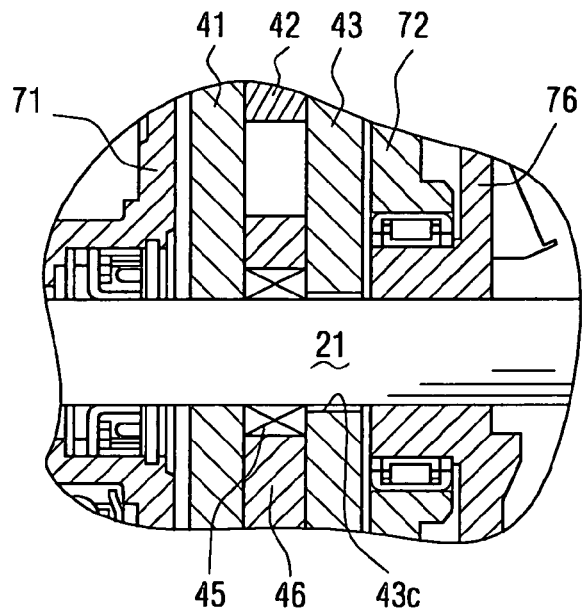
FIG. 8 is a cross-sectional view of a sealing portion of a fluid machine according to a fourth embodiment of the present invention.

FIG. 8 shows an enlarged partial cross-sectional view of a sealing construction for the fluid machine, according to a fourth embodiment of the present invention. In the first embodiment shown in FIG. 1, the seal element 22 is disposed between the expansion device 4 and the compressor device 7, and therefore, different refrigerant gases can be used for the Rankine cycle and the refrigerating cycle. In the case that the same or similar kind of the refrigerant gas is used for the both cycles, it is not necessary to strictly seal between the expansion device 4 and the compressor device 7.

In the fourth embodiment shown in FIG. 8, a cylindrical sealing portion 43c is formed at an inner surface of the rear side plate 43 facing to the shaft 21, instead of the seal element 22. The cylindrical sealing portion 43c in this embodiment means such an inner surface of the side plate 43 facing to the outer surface of the shaft 21 with a minute gap so that an oil film can be easily formed at the outer surface of the shaft 21 and the refrigerant gas can be substantially prevented from flowing through between the expansion device and the compressor device with a help of the minute gap extending in the longitudinal direction.

It is, therefore, more advantageous compared with the seal element 22 in that a process for assembling will become easier and there is no mechanical loss to be caused by the seal element to improve the energy saving.

Fifth Embodiment

Figure 9:
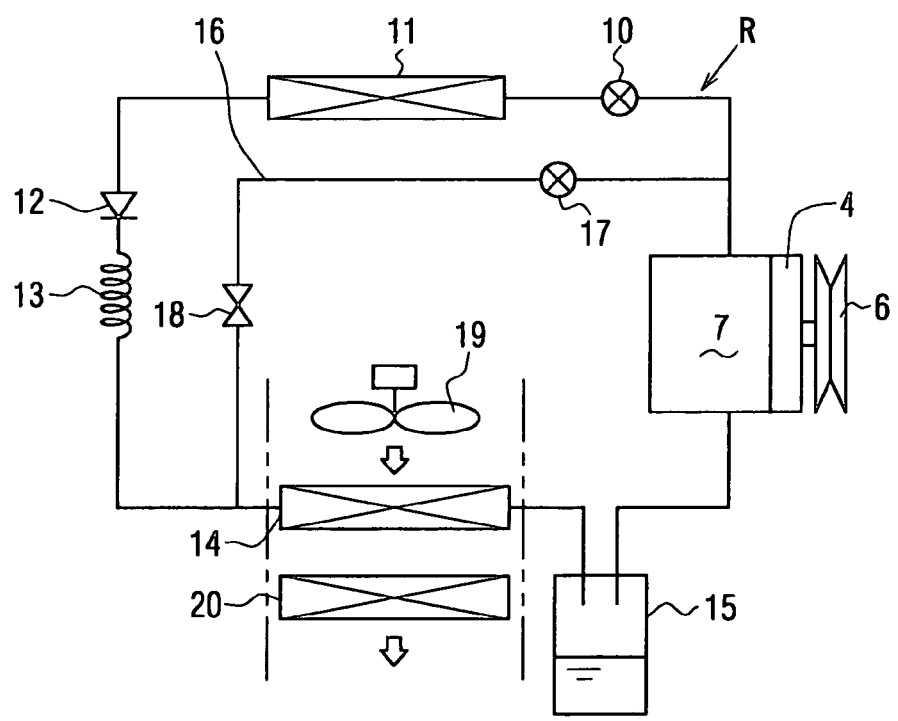
FIG. 9 is a schematic diagram showing a refrigerating cycle having a hot gas bypass passage according to a fifth embodiment of the present invention.

The fifth embodiment of the present invention is an embodiment in which the fluid machine of the present invention is applied to a refrigerating cycle R having a hot gas bypass circuit, a schematic view of which is shown in FIG. 9. The expansion device 4 and the compressor device 7 are connected to an engine (not shown) via the pulley 6. To an outlet side of the compressor device 7, a condenser 11 is connected via a first electromagnetic valve 10, and a first pressure reducing device 13 is connected to the condenser 11 via a check valve 12, wherein the first pressure reducing device 13 is composed of a capillary tube (a fixed orifice).

An evaporator 14 is connected to an outlet side of the first pressure reducing device 13 and also connected at its downstream side to the inlet side of the compressor device 7 via an accumulator 15. A hot gas bypass passage 16 connects the outlet side of the compressor device 7 to the inlet side of the evaporator 14 through a second electromagnetic valve 17 and a second pressure reducing device 18 so that it bypasses the valve 10, the condenser 11, the check valve 12 and the pressure reducing device 13. The second pressure reducing device 18 is a constant pressure valve which is opened when a pressure of the refrigerant gas from the compressor device 7 becomes higher than a predetermined value.

The evaporator 14 is disposed in an air-conditioner casing (two dot chain lines) and cools down the air from a blower fan 19 during the air-conditioning operation. In a heating operation, a high pressure and high temperature refrigerant gas (hot gas) will flow into the evaporator 14 through the bypass passage 16, to heat the air from the blower fan 19, so that the evaporator 14 operates as a heat radiating device in this operation. A heat exchanger 20 is disposed at a downstream side of the evaporator 14 within the air-conditioner casing for heating the air flowing therethrough by use of engine coolant as a heating source. Accordingly, the air-conditioned air will be blown out into a passenger compartment through air ducts (not shown)

In the case that it is necessary to warm up the engine, the temperature of the engine coolant is not sufficiently high enough to heat the passenger compartment. In this case, the quick warming up of the engine will be achieved by operating the compressor device 7 to make it a load to the engine, and supplying the refrigerant gas (hot gas) from the compressor device 7 to the evaporator 14 through the bypass passage 16.

Sixth Embodiment

Figure 10:
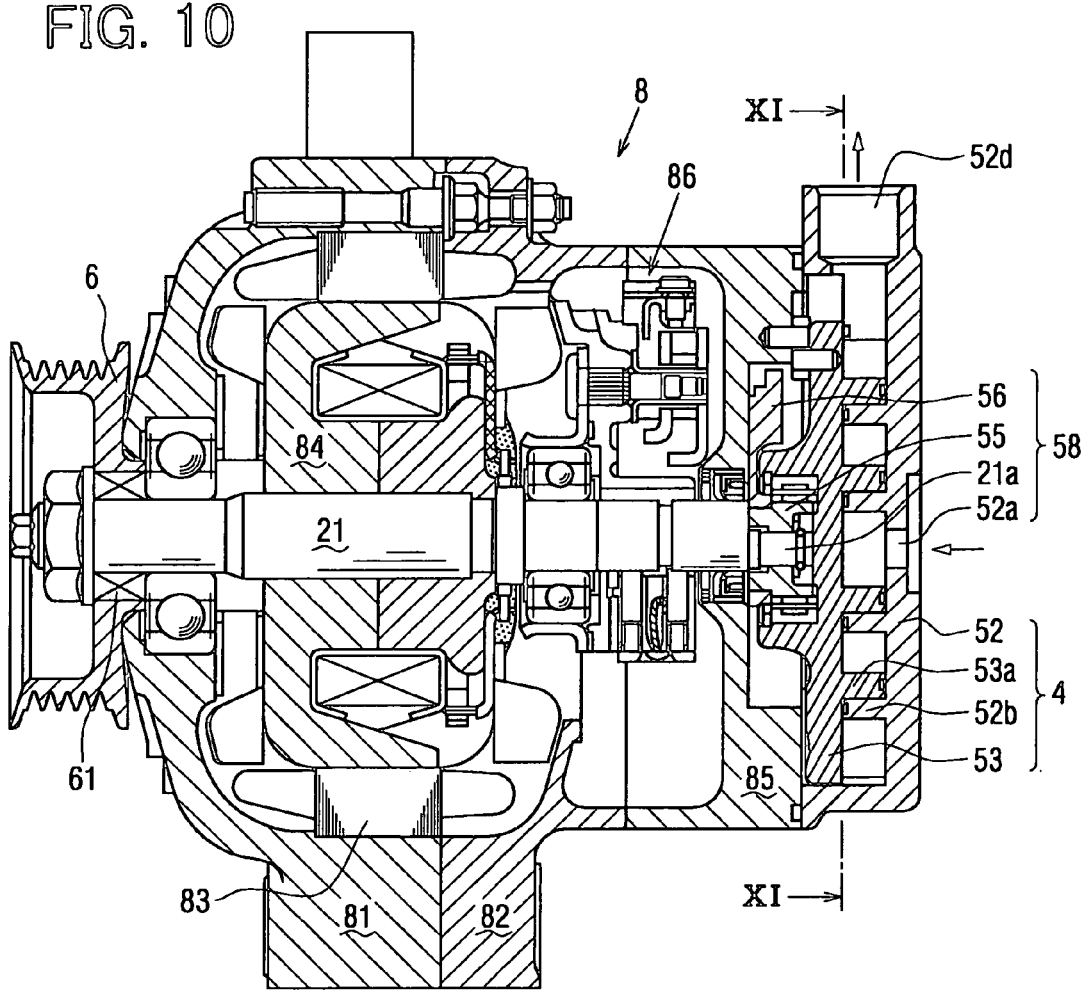
FIG. 10 is a cross-sectional view showing a fluid machine according to a sixth embodiment of the present invention.
Figure 11:
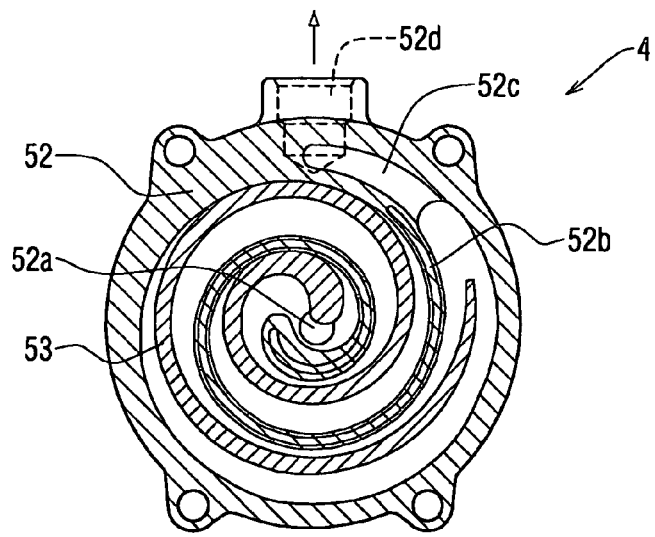
FIG. 11 is a cross-sectional view of an expansion device taken along a line XI—XI in FIG. 10.

FIG. 10 shows a sixth embodiment of the present invention, in which the fluid machine according to the present invention is installed in the motor vehicle, and an alternator 8 is driven by an engine and an expansion device rotated by waste heat.

The fluid machine in this embodiment comprises the expansion device 4, the alternator 8 and the pulley 6, wherein the shaft 21 is commonly connected to the above devices.

The pulley 6 is connected to the shaft 21 over a one-way clutch 61. The alternator 8 has a well known construction, in which a stator 83 and a rotor 84 are disposed in a front housing 81 and a rear housing 85. A voltage regulator 86 is disposed in the rear housing 85 and a middle housing 82.

The expansion device 4 of a scroll type is disposed on an opposite end to the pulley 6 and comprises a fixed scroll 52 and a movable scroll 53, each spiral wrap 52b and 53a of which engages with each other to form multiple working chambers. The high pressure refrigerant gas flowing from an inlet port 52a formed in a housing 52 (=the fixed scroll) into the working chamber will be expanded and thereby the movable scroll 53 will be rotated by this expansion energy, and the refrigerant gas will be flowing out through an outlet port 52d through an outlet passage 52c.

Figure 12A:
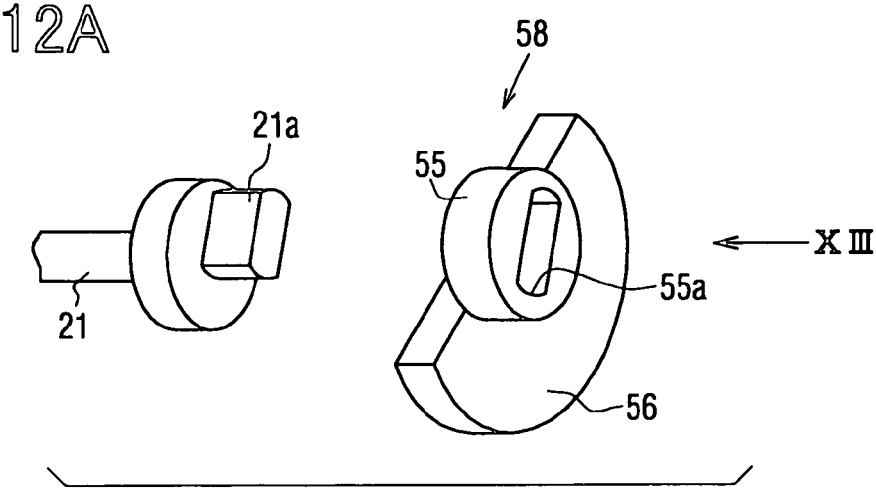
FIG. 12A is a perspective view of a crank mechanism.
Figure 12B:
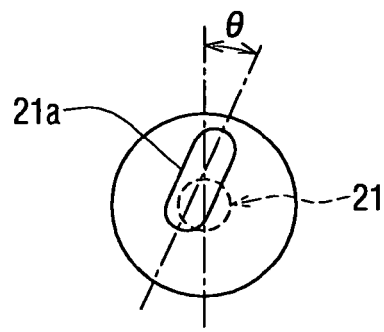
FIG. 12B is a front view of shaft shown in FIG. 12A.
Figure 13:
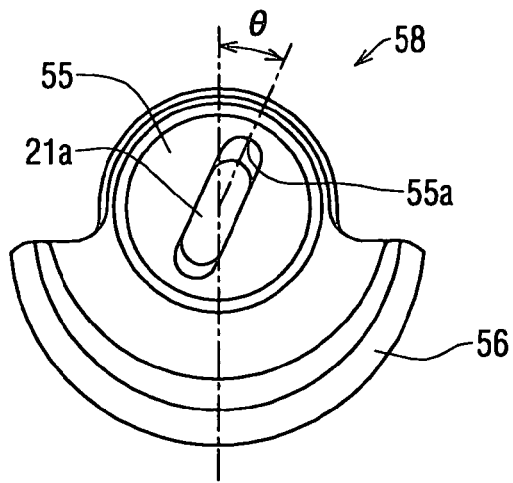
FIG. 13 is a front view of the crank mechanism shown in FIG. 12A.
Figure 14A:
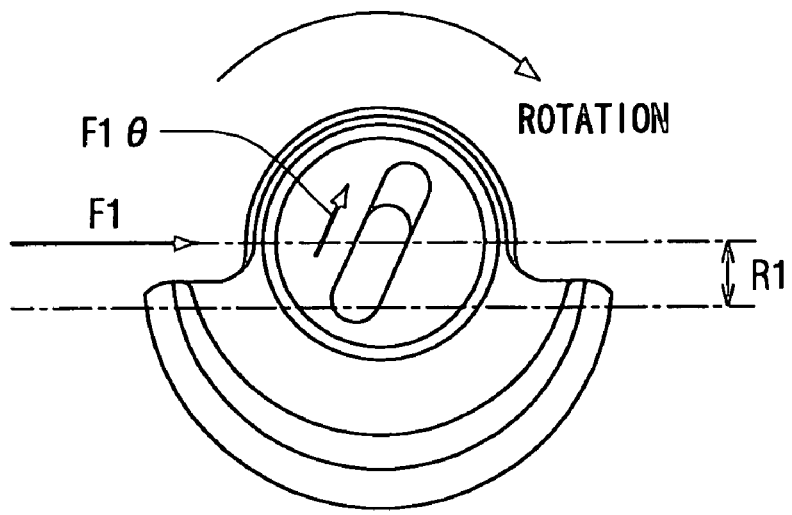
FIGS. 14A and 14B are the front views of the crank mechanism for explaining the operation thereof.
Figure 14B:
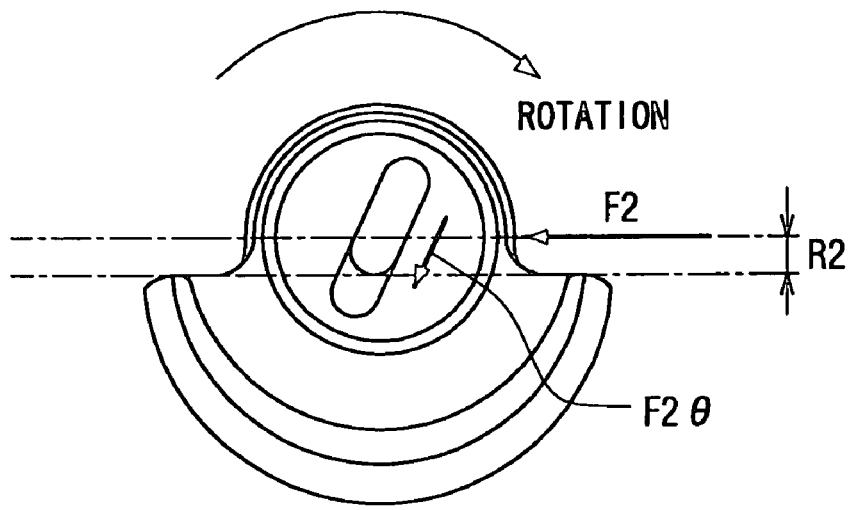

The expansion device 4 is operatively connected to the shaft 21 over a crank mechanism 58, so that the rotation of the shaft 21 will be transmitted to the movable scroll 53 and a radius of the orbital movement of the movable scroll 53 can be varied. FIG. 12A shows a perspective view of the crank mechanism 58 and FIG. 13 shows a schematic view of the crank mechanism 58 when viewed in a direction of an arrow designated by XIII in FIG. 12A, in which a key portion 21a is fixed at the end of the shaft 21 and inserted into a groove 55a formed in a bush 55. The key portion 21a is so formed that a longitudinal center line of the key portion 21a is inclined towards a rotational direction of the shaft 21 by an angle θ with respect to a line passing on the center of the shaft 21, as shown in FIG. 12B or FIG. 13. A longitudinal length of the groove 55a is longer than a longitudinal length of the key portion 21a, so that the key portion 21a is movable in its longitudinal direction relative to the groove 55a. A movable distance of the key portion 21a in the groove 55a is smaller than a distance between the spiral wraps of the fixed and movable scrolls 52 and 53 in a line passing on the center of the bush 55.

The width of the groove 55a is made slightly larger than the width of the key portion 21a so that the key portion 21a is movable in the groove 55a, as already mentioned above. A balance weight 56 is formed at the bush 55 to cancel a centrifugal force of the movable scroll 53 appearing during its orbital movement.

The bush 55 is inserted into a cylindrical bore formed in the movable scroll 53. When the shaft 21 is rotated, the bush 55 is rotated on an axis of the shaft 21. Accordingly, the orbital movement of the bush 55 is transmitted to the movable scroll 53, and vice versa.

When the expansion device 4 is operated and the rotational driving force from the expansion device 4 is applied to the shaft 21, the force F1 is applied from the bush 55 to the key portion 21a so that a component force F1θ is generated to push the bush 55 in the direction of this component force. As a result, a distance between the center of the shaft 21 and the center of the bush 55, which is equal to a radius (R1) of the orbital movement of the movable scroll 53, will become larger.

On the other hand, when the expansion device 4 is idle running, a resistance force F2 appears at the bush 55 so that a component force F2θ is generated to push the bush 55 in its direction. Then the radius (R2) of the orbital movement of the movable scroll 53, which is a distance between the center of the shaft 21 and the center of the bush 55, will be decreased. The operation of the crank mechanism is described more in detail in other prior art, for example, in Japanese Patent No. 2687873.

(Electric Power Generating Mode)

An operation of this sixth embodiment will be explained. When electric power demand is high, the shaft 21 is rotated by an engine through a belt and the alternator 8 is operated. The generated electric power is charged to a battery (not shown) or supplied to other electric accessories. When the electric power demand is low, the generation of the electric power is controlled by a voltage regulator 86 to decrease power consumption from the engine. When the electric power demand is very low, no electric power will be generated at the alternator 8.

In the above electric power generating operation, when the waste heat to be collected from the engine is small, the refrigerant gas of the Rankine cycle L will not be pressurized by a pump (not shown) and no high pressure gas will be supplied to the expansion device 4. However, since the shaft 21 is rotated by the engine, the crank mechanism 58 and the movable scroll 53 are rotated.

As mentioned above, when the movable scroll is rotated by the shaft 21 over the crank mechanism 58, the radius of the orbital movement of the movable scroll is made smaller, and thereby a space is formed between the scroll wraps of the fixed and movable scrolls 52 and 53. As a result, even when the movable scroll 53 is rotated with the orbital motion, it will not work as a fluid machine and therefore the power consumption for moving the movable scroll is very small.

If it is desired to avoid the idle running of the movable scroll 53, a one-way power transmitting means, such as a one-way clutch can be provided between the shaft 21 and the movable scroll 53 instead of the crank mechanism 58. With this crank mechanism 58 or the one-way clutch, the rotation of the shaft 21 and the operation of the alternator 8 function well, even in case the expansion device is not operated. And the power consumption from the engine can be suppressed to a minimum amount.

In the above electric power generating operation, when the waste heat to be collected from the engine is sufficiently high, the refrigerant gas of the Rankine cycle L will be pressurized by the pump (not shown) and high pressure gas will be supplied to the expansion device 4 to operate the same. Until a rotational speed of the expansion device 4 reaches a rotational speed of the shaft 21, the expansion device is running idle due to the crank mechanism 58 (or the one-way clutch), so that the rotation of the expansion device 4 will not be an obstacle to the rotation of the shaft 21.

During the above operation, no load is applied to the expansion device 4, and therefore, the rotational speed thereof will quickly increase to the rotational speed of the shaft 21. At this point, the crank mechanism 58 (or the one-way clutch) becomes out of the idle running, and the shaft 21 will be rotated together with the expansion device 4. The rotational driving force from the expansion device 4 is accordingly applied to the shaft 21 and the expansion device 4 and the shaft 21 driven by the engine share the rotational force for the alternator 8, to thereby decrease the power consumption from the engine. In this embodiment, although the scroll-type expansion device is used, the other type of the expansion device can be used to obtain the same effect.

(Idle-stop Operation Mode)

The electric power demand exists not only during an idle-stop period of the engine but also when the engine running is stopped in the other situation. In the case that the electric power from the battery is running short, the electric power generation is necessary and therefore in such a case the expansion device 4 will be operated to drive the alternator 8. This operation is possible so long as there are sufficient amount of waste heat to be collected from the engine, whether or not the engine is running.

Since the one-way clutch 61 is disposed between the pulley 6 and the shaft 21, the rotation of the shaft 21 by the expansion device 4 will not be affected by the pulley 6 which is not rotated due to the no-running of the engine.

In other words, it is possible to stop the running of the engine, while keeping the electric power generation, to achieve a reduction of the fuel consumption ratio. In this operation, the alternator 8 can be operated by the voltage regulator to generate the minimum amount of the necessary electric power, because the alternator 8 is driven by the rotational driving force only from the expansion device 4.

(Operation Mode of No Electric Power Generation)

In the case that the battery is fully charged or the engine should be operated at its minimum fuel consumption ratio, the operation of the alternator 8 can be stopped by the voltage regulator. Even in this case, when there is sufficient waste heat from the engine, the Rankine cycle L will be operated and the rotational driving force from the expansion device 4 can be transmitted to the engine through the shaft 21, the one-way clutch 61, the pulley 6 and the belt, to assist the running of the engine. As a result, the load to the engine will be decreased and the engine running with lower fuel consumption can be achieved.

As understood from the above sixth embodiment, the expansion device 4 is attached to the alternator at the opposite side to the pulley. Accordingly, the alternator can be commonly used for the engine (or a motor vehicle), whether or not the expansion device is necessary. The scroll type expansion device 4 is used here, so that the shaft 21 may not protrude into the expansion device 4, and thereby a compact and simple construction for the fluid machine can be obtained.

Since the crank mechanism 58 is disposed between the shaft 21 and the expansion device 4 and the radius of the orbital movement can be varied, the higher sealing effect between the fixed and movable scrolls can be obtained, and the load for driving the expansion device when it is not operated by the Rankine cycle can be minimized.

Since the alternator 8 as the engine accessory is disposed between the pulley 6 and the expansion device 4, such an alternator having a general construction can be used here and flow of cooling air for the alternator will not be affected by the expansion device 4.

Other Embodiments

In the above embodiments, the compressor device and the alternator are used as accessories which are driven by the expansion device. It is, however, possible to use other devices, such as an oil pump for a power steering apparatus, a water pump for circulating engine cooling water, a viscous coupling device for generating a heating energy during a start-up period at a very low ambient temperature, and so on. The fluid machine according to the present invention can be used for not only the motor vehicle, but also a rotating machine for a stationary engine of an air-conditioning system, and so on.

What is claimed is:

1. A fluid machine for a system having an engine comprising:
   a waste heat collecting cycle for collecting waste heat from the engine and having an expansion device for generating rotational driving force from the collected waste heat; and
   an engine accessory operatively connected to the engine and driven by a driving force from the engine, wherein
   a rotating shaft is commonly used as shafts for the expansion device and the engine accessory, and
   the expansion device is a scroll type expansion device for changing its expansion volume, in which a movable scroll is rotated with an orbit motion to a fixed scroll.

2. A fluid machine according to claim 1, further comprising:
   a crank mechanism disposed between the shaft and the expansion device to vary a radius of the orbit motion of the movable scroll by the rotational driving force from the expansion device.

3. A fluid machine according to claim 1, wherein
   the engine accessory is an alternator for generating electric power, and
   the fluid machine further comprises a connecting device for operatively connecting the expansion device with the alternator, when an operation of the engine is stopped, so that the alternator is continuously driven by the rotational driving force from the expansion device.

4. A fluid machine according to claim 3, wherein
   the connecting device is a one-way clutch provided between the alternator and the expansion device.

5. A fluid machine for an automotive vehicle having an internal combustion engine comprising:
- a pulley operatively connected to the engine and rotationally driven by a rotational driving force from the engine;
- a waste heat collecting cycle for collecting waste heat from the engine and having an expansion device for generating rotational driving force from the collected waste heat;
- an alternator for generating electric power and operatively connected to the pulley and the expansion device so that the alternator is driven by the driving force from at least one of the engine and the expansion device; and
- a rotating shaft commonly used as shafts for the pulley, the alternator and the expansion device.

6. The fluid machine according to claim 5, wherein a one-way clutch is provided between the pulley and the shaft.

7. The fluid machine according to claim 5, wherein a crank mechanism is provided between the shaft and the expansion device.

8. The fluid machine according to claim 5, wherein a one-way clutch is provided between the shaft and the expansion device.

9. The fluid machine according to claim 5, wherein the expansion device includes a pair of cooperating scroll elements.

* * * * *